Figure 1:
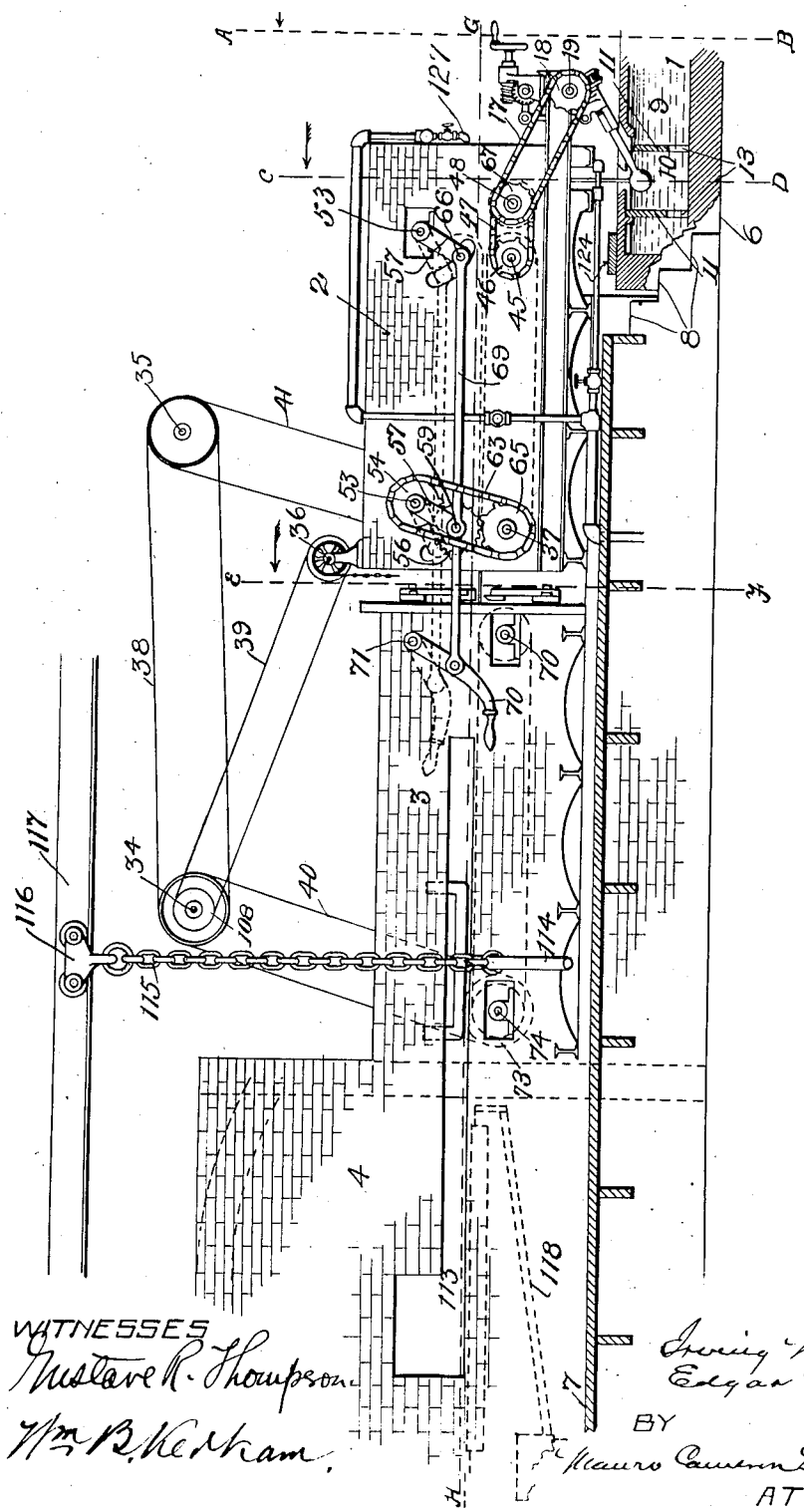

No. 876,267.

PATENTED JAN. 7, 1908.

I. W. COLBURN & E. WASHBURN.
PROCESS AND APPARATUS FOR THE CONTINUOUS PRODUCTION OF SHEET GLASS.
APPLICATION FILED DEC. 28, 1904.

10 SHEETS—SHEET 1.

WITNESSES

INVENTORS
Irving W. Colburn
Edgar Washburn
BY
Mauro Cameron Lewis Massie
ATTORNEYS No. 876,267.  
PATENTED JAN. 7, 1908.

I. W. COLBURN & E. WASHBURN.  
PROCESS AND APPARATUS FOR THE CONTINUOUS PRODUCTION OF SHEET GLASS.  
APPLICATION FILED DEC. 28, 1904.

10 SHEETS—SHEET 5.

No. 876,267. PATENTED JAN. 7, 1908.
I. W. COLBURN & E. WASHBURN.
PROCESS AND APPARATUS FOR THE CONTINUOUS PRODUCTION OF SHEET GLASS
APPLICATION FILED DEC. 28, 1904.

10 SHEETS—SHEET 6.

No. 876,267. PATENTED JAN. 7, 1908.
I. W. COLBURN & E. WASHBURN.
PROCESS AND APPARATUS FOR THE CONTINUOUS PRODUCTION OF SHEET GLASS.
APPLICATION FILED DEC. 28, 1904.
10 SHEETS—SHEET 9.

WITNESSES

INVENTORS
BY
ATTORNEYS

No. 876,267. PATENTED JAN. 7, 1908.
I. W. COLBURN & E. WASHBURN.
PROCESS AND APPARATUS FOR THE CONTINUOUS PRODUCTION OF SHEET GLASS.
APPLICATION FILED DEC. 28, 1904.
10 SHEETS—SHEET 10.
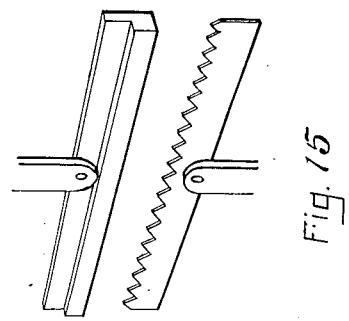
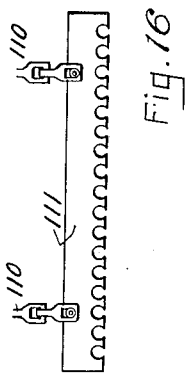
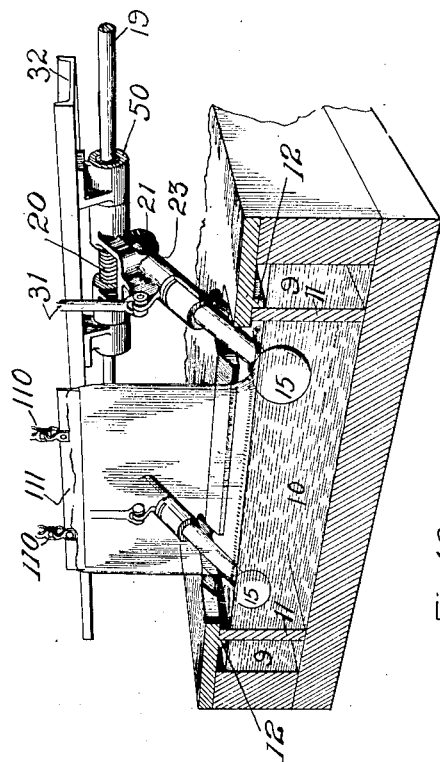
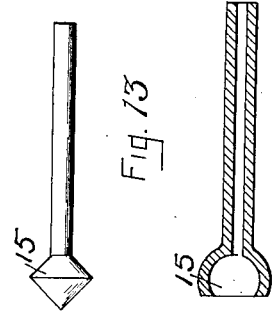
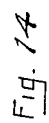
WITNESSES
INVENTORS
BY
ATTORNEYS

UNITED STATES PATENT OFFICE.

IRVING W. COLBURN AND EDGAR WASHBURN, OF FRANKLIN, PENNSYLVANIA, ASSIGNORS, BY DIRECT AND MESNE ASSIGNMENTS, TO COLBURN MACHINE GLASS COMPANY, OF FRANKLIN, PENNSYLVANIA, A CORPORATION OF NEW JERSEY.

PROCESS AND APPARATUS FOR THE CONTINUOUS PRODUCTION OF SHEET-GLASS.

No. 876,267.     Specification of Letters Patent.     Patented Jan. 7, 1908.

Application filed December 28, 1904. Serial No. 238,592.

*To all whom it may concern:*

Be it known that we, IRVING W. COLBURN and EDGAR WASHBURN, residents of Franklin, Pennsylvania, have invented a new and useful Process and Apparatus for the Continuous Production of Sheet-Glass, which invention is fully set forth in the following specification.

This invention relates to the art of glass making, and more particularly to the art of making sheet glass.

The object of the invention is to provide a process and an apparatus whereby sheet glass, of substantially uniform width, may be continuously drawn from a mass of molten glass, severed into sections of suitable size, and, if desired, then flattened and subsequently annealed, after which it may be cut up into desired sizes for the market.

Many efforts have heretofore been made to continuously draw a sheet of glass from a molten mass, but without practical commercial success. When an effort is made to draw glass in sheet form from a molten mass, while the glass at the starting of the operation may emerge from the molten mass in the form of a sheet, it speedily narrows until it becomes a mere rope or thread, and for this reason, in the commercial production of sheet glass, it has been common to produce cylinders of glass which were subsequently split, and after being softened by heat, spread out and flattened by some suitable flattening device provided for the purpose.

By the present invention it is for the first time rendered commercially practicable to continuously produce sheet glass which shall have a fine finish, be free from flaws or irregularities, and of substantially uniform width. According to the present invention the glass is preferably drawn from a continuous melting tank or furnace, preferably of considerable length, into which the batch and cullet are frequently fed, to the end that the working surface of the glass in the furnace may be maintained approximately constant. As the glass is subjected to heat and advances along the melting furnace or tank, it is gradually settled, refined and purified and brought to approximately the proper condition for drawing the glass therefrom. Preferably there is provided in the end of said working furnace or tank any suitable working chamber into which the molten glass is led and wherein it is protected from the fire of the main furnace, and within which it may be subjected to burners or other forms of heat for the purpose of bringing it into the desired condition for the drawing operation. In this drawing operation any suitable means, as any desired form of bait, is employed to start the sheet, the bait being withdrawn from the molten mass, and as it leaves the surface thereof drawing a sheet of glass therefrom, in a manner that will be well understood by those skilled in the art.

Simultaneously with the movement of the bait away from the surface of the molten mass of glass, movement is imparted to the surface of the molten mass at the points where the edges of the sheet of glass leave the molten mass, the movement at these two points being in opposite directions and outward or away from the medial line of the sheet being drawn. Any suitable means may be employed for imparting this movement in opposite directions to the surface of the molten mass adjacent to the edges. Preferably there are immersed, either partially or wholly below the surface of the molten glass, suitable bodies which are slowly revolved in opposite directions so that the adjacent or inner sides move upward and their upper sides move outward or away from the center of the sheet. The effect of this slow revolving movement of the immersed or partially immersed bodies is to impart a like movement to the molten glass in immediate contact with or proximity thereto, thereby counteracting the tendency of the sheet to narrow or pull to a thread or string during the drawing operation. Any suitable form may be given to the revolving bodies before mentioned. They may be in the form of spheres, hemispheres, cones or otherwise, and the same may be wholly immersed below the surface of the mass of molten glass or, as in the case of conical bodies, they may be so positioned in the mass that the surface of the cone may be partially below the surface of the molten glass, and partially in contact with the surface of the sheet as the latter emerges from the molten mass, as set forth in our U. S. application Sr. No. 208, 941, filed May 20, 1904. Means are provided for positioning the revolving bodies in the mass of molten glass so that they may be immersed to a greater or less extent as occasion may require.

The sheet of glass having been drawn from a molten mass and of uniform width, is then permitted to cool sufficiently to cause it to set, but while still very hot is passed upwardly, preferably in a vertical direction, into a heating chamber wherein it is subjected to heat and is bent from its substantially vertical position to an approximately horizontal position, and passed onto a suitable carrier. In order that the glass may be thus bent, means are provided in the form of a revolving surface over which the sheet of glass is bent, and it is important at the time when the sheet passes over said revolving surface (here shown in the form of a roller or drum), that it should be heated enough to readily bend without breaking and at the same time it should be hard enough to pass over the roller or drum without having its surface marred.

When the sheet is first started it is attached to the bait as above described, and the bait is drawn upward and over the roller or drum and through the heating chamber in which the said roller or drum is located, onto a carrier in said chamber, the carrier and bait moving at the same speed, and as the sheet emerges from the chamber the bait is severed from the sheet and is not used in the subsequent operations. For the purpose of effecting the feed of glass after the bait is severed therefrom, feeding devices are provided, preferably acting in conjunction with the carrier in the heating chamber above mentioned. The glass in this chamber becomes more or less flexible and the feed device herein shown takes the form of a series of grip bars carried by endless sprocket chains, which grip bars at intervals are pressed down upon the surface of the sheet of glass, holding the sheet between said grips and the table or carrier, and as the grips advance, drawing the sheet with them. The grips just mentioned produce a marring effect in a line across the sheet, but this is unimportant since, as will appear hereinafter, the sheet of glass is separated into sections at the points where this marring has occurred.

The glass having been rendered more or less plastic as it leaves the heating chamber just mentioned, is then scored or otherwise cut for the purpose of separating the sheet into sections at the desired points. For the purpose of effecting this scoring, means are provided whereby the sheet of plastic glass is compressed along the desired line between a pair of scoring devices immediately after it passes from the heating chamber, and while it is in a more or less plastic condition. The glass having been thus scored is immediately passed into a second chamber whose temperature is somewhat lower than that of the first or heating chamber, the two chambers being placed in such close juxtaposition that there is no danger of shattering the glass by sudden exposure to chill, as it passes from one to the other. In this second chamber the temperature of the sheet is sufficiently lowered so that when a glass-handler's fork is inserted beneath the end section and the same slightly tilted or lifted, the section cracks or breaks away from the advancing sheet. The glass at this point will be found to possess a very fine fire finish, and to be almost perfectly flat, and if desired may be cut into marketable sizes. It is preferred, however, for the purpose of entirely eliminating every trace of unevenness in the sheet, to subject it to a flattening operation and subsequently it may be annealed. For this purpose the severed section of glass is passed into any suitable flattening oven provided with the usual flattening stones, and rubbed with rubbing blocks of bass-wood or other suitable material, and as it emerges from the flattening oven it is advanced to the annealing leer which may be of the usual or any suitable construction, and as it emerges from the leer it is received by workmen who wash and cut it up into commercial sizes for the market.

Figure 2:
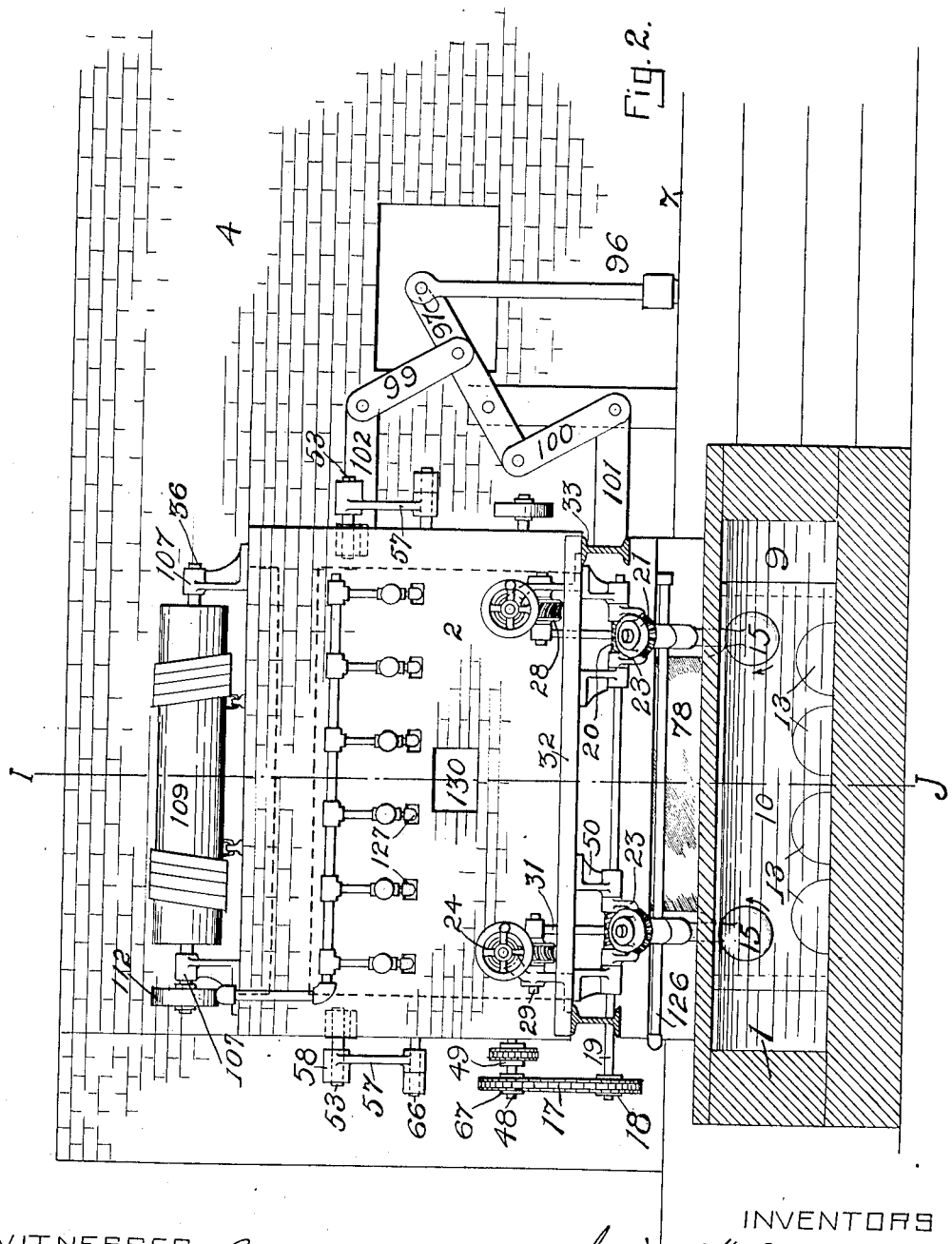
Figure 3:
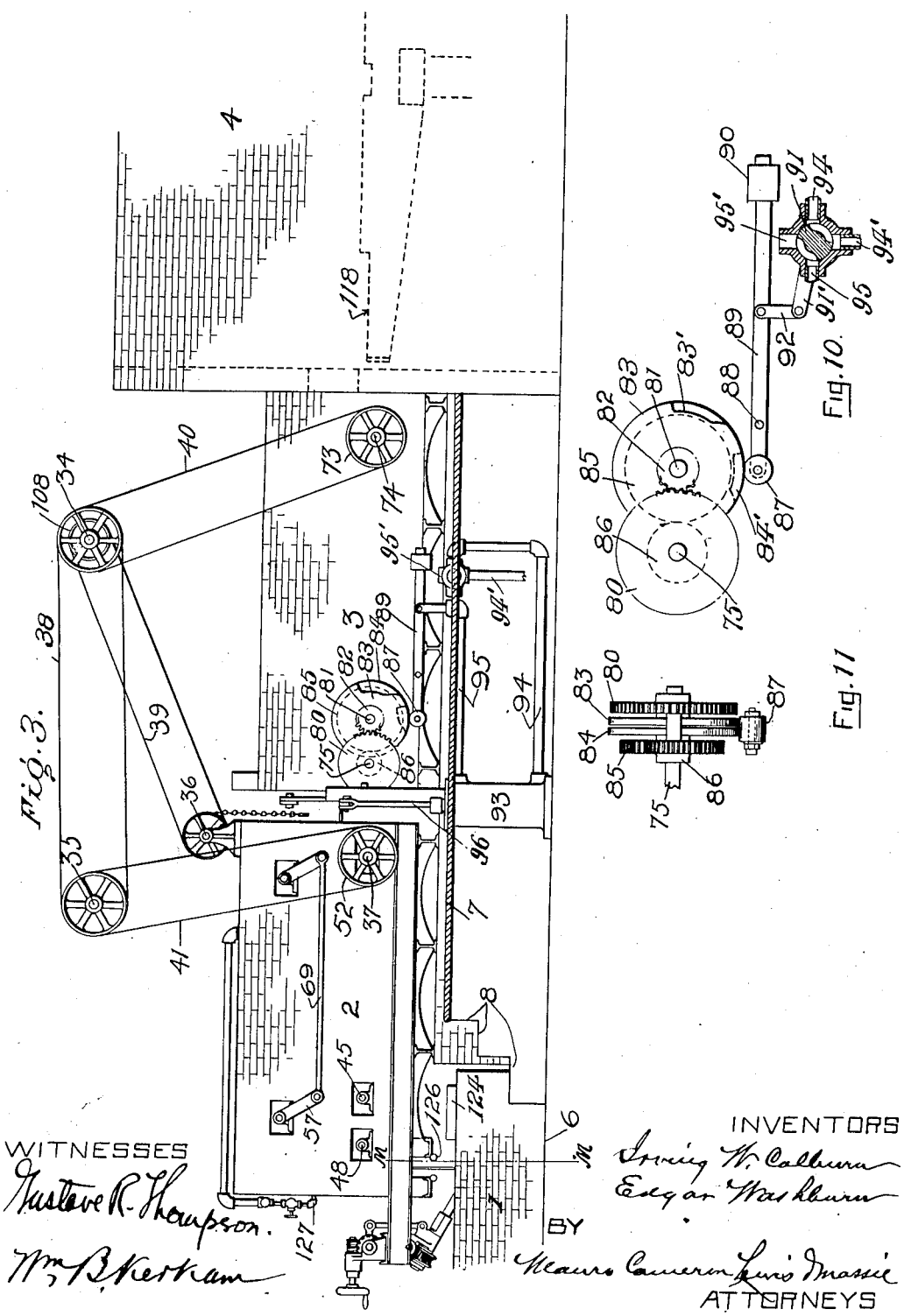
Figure 4:
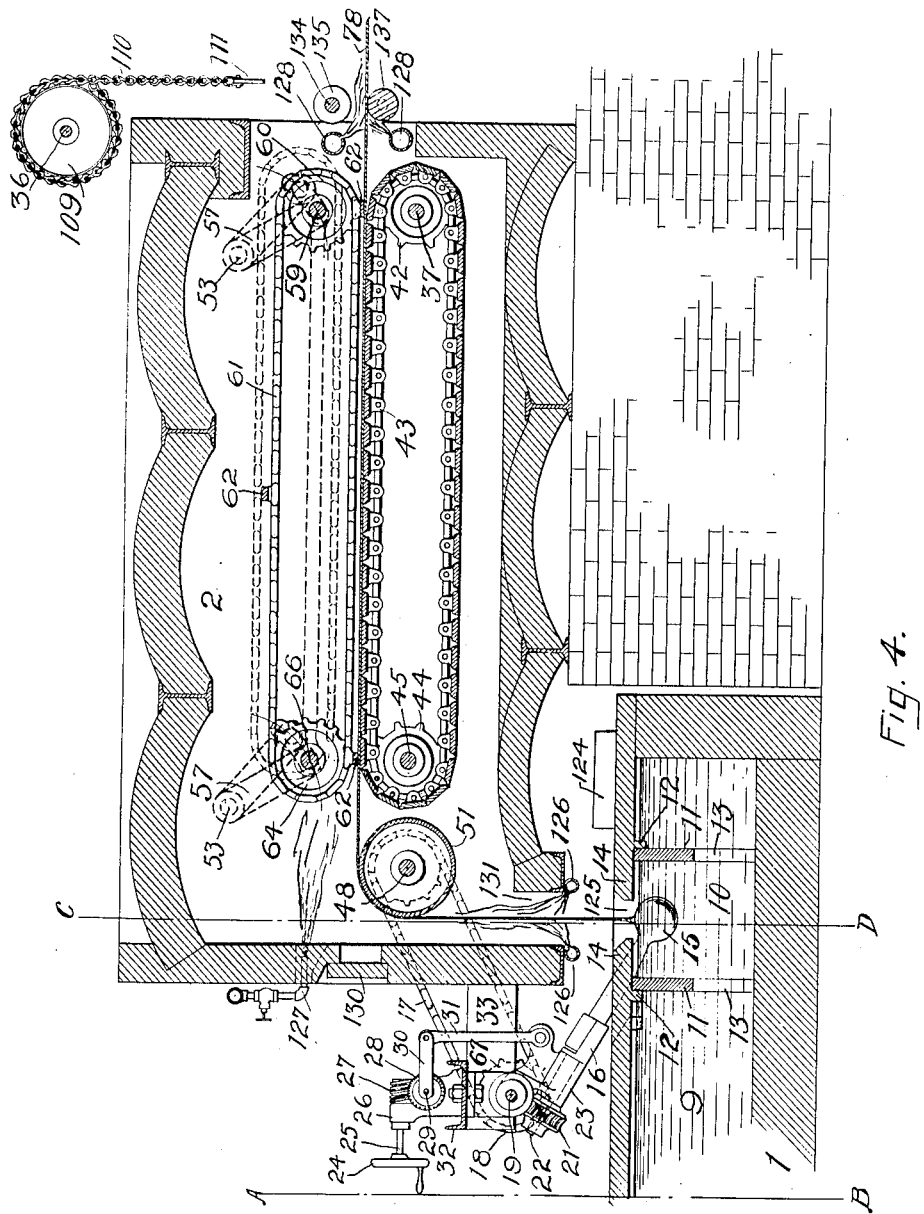
Figure 5:
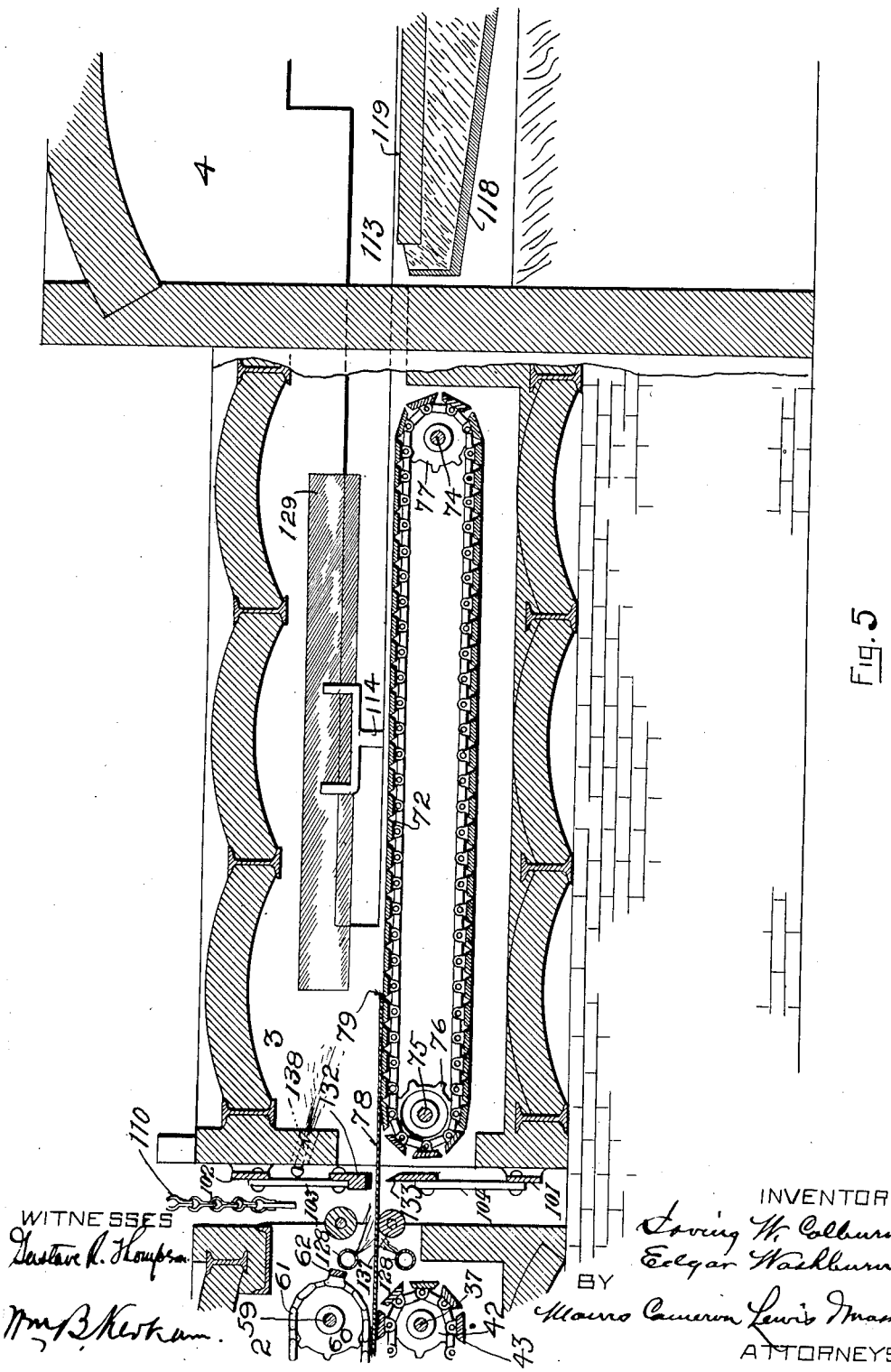
Figure 6:
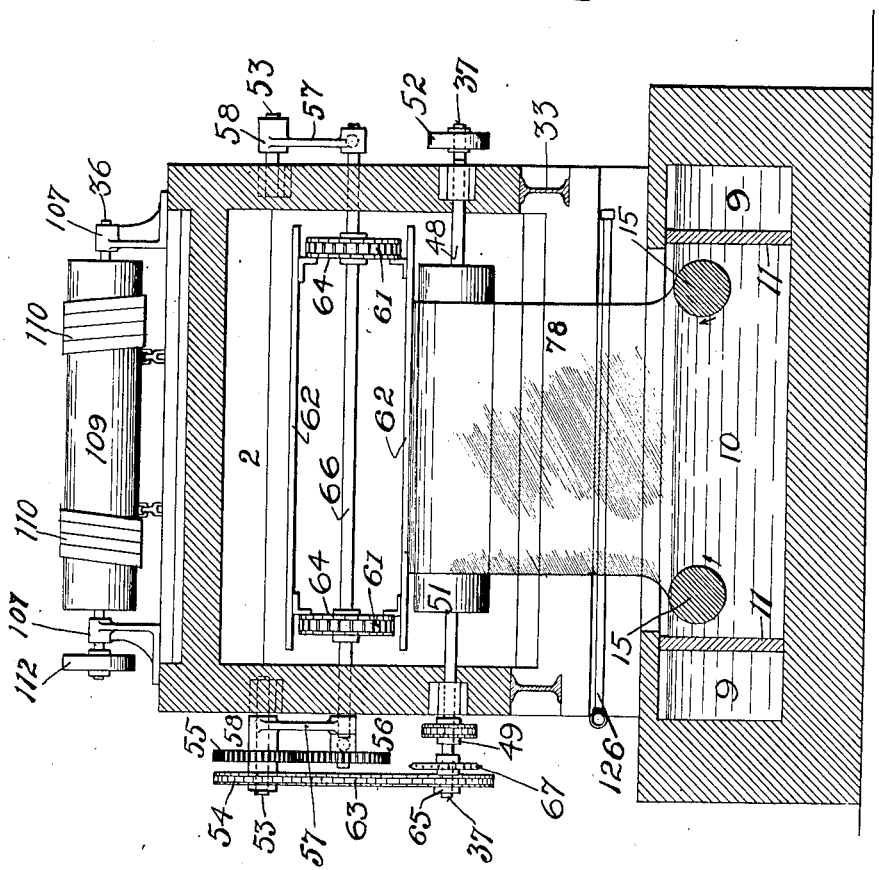
Figure 7:
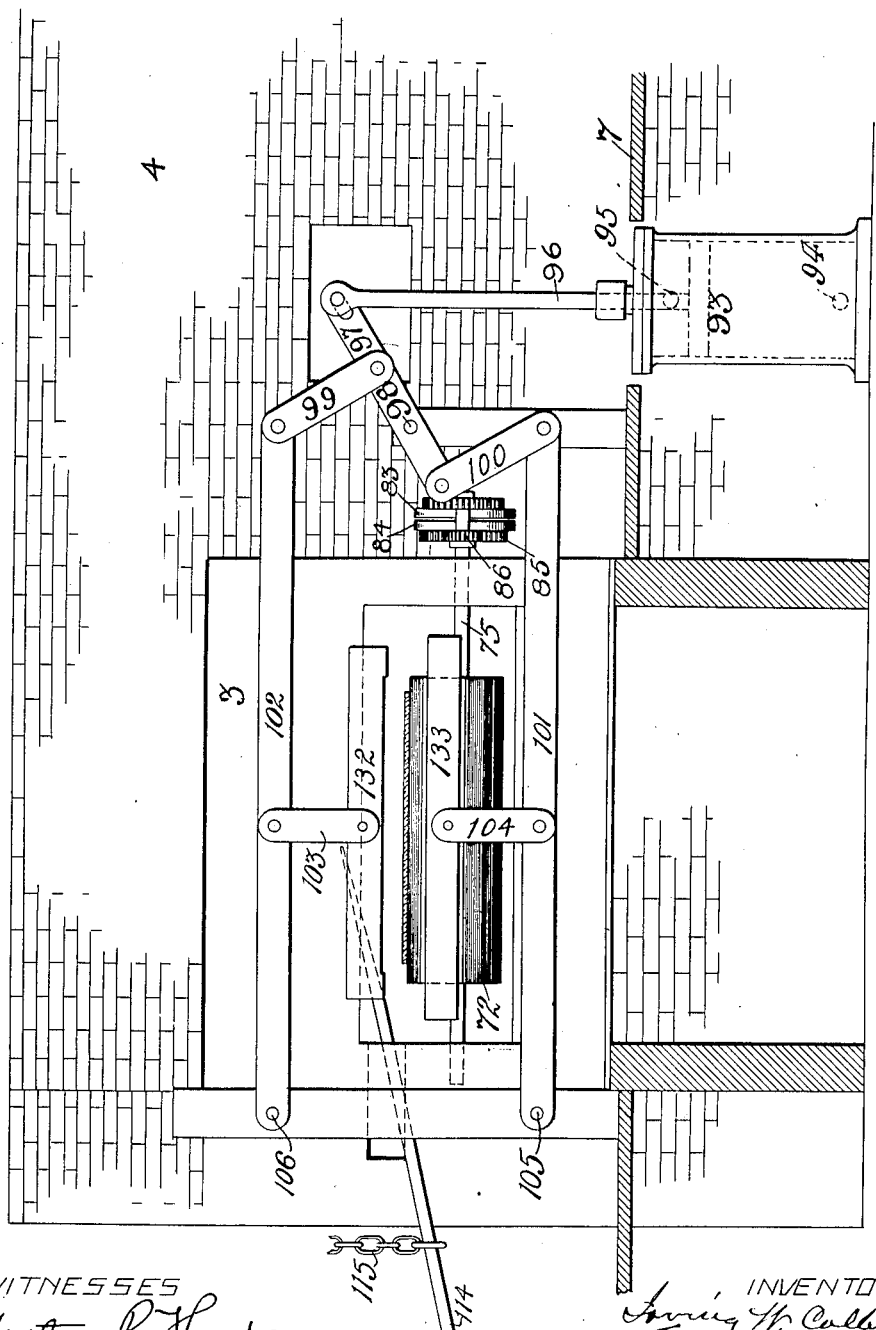
Figure 8:
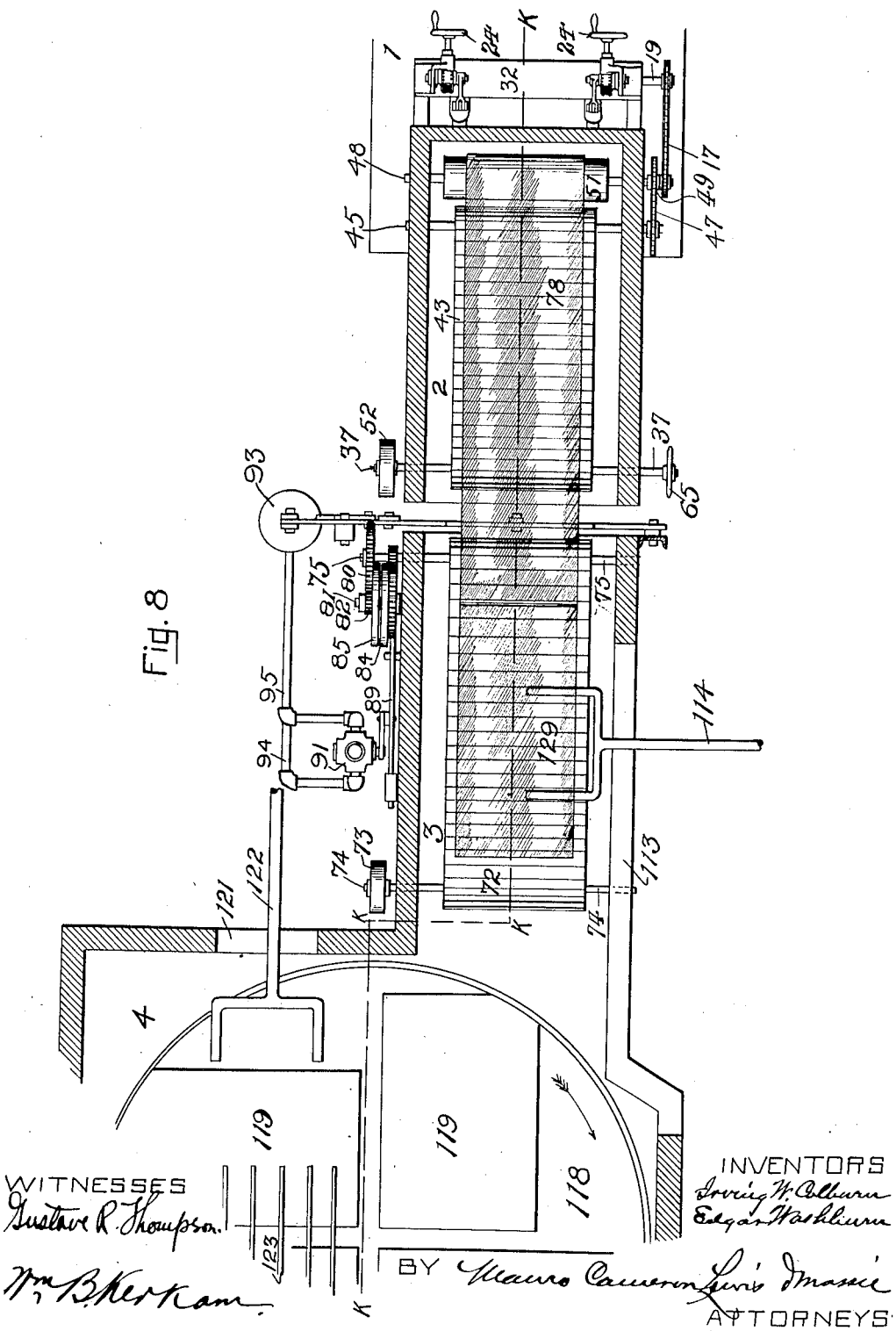
Figure 9:
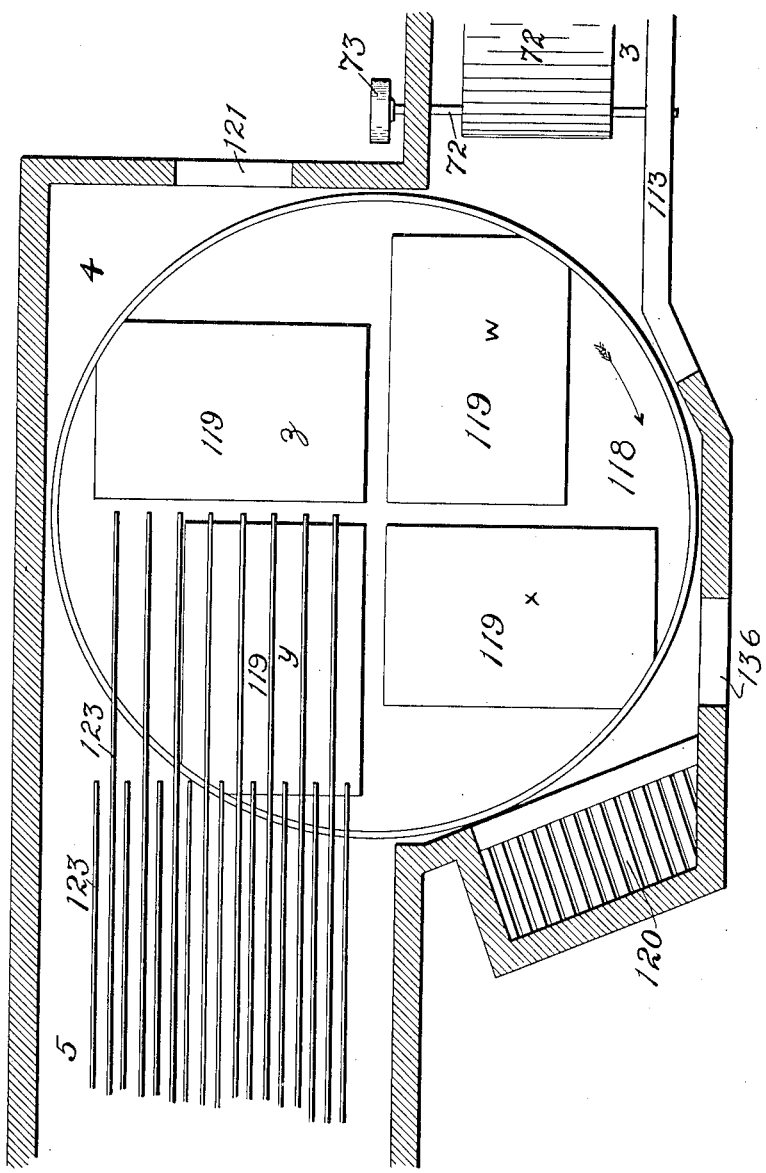

Many of the features of the invention may be used without employing all of them, as some of those which are non-essential may be omitted without departing from the spirit of the invention, though such omission may to a greater or less extent affect the quality of the product. Moreover, the apparatus portion of the invention is capable of receiving various mechanical expressions without departing from the spirit of the invention itself; and, for the purpose of describing the invention, there is illustrated in the accompanying drawings the preferred forms of apparatus, in which drawings Figure 1 is a side elevation of the apparatus employed; Fig. 2 is a front elevation thereof on the line A—B, Fig. 1, showing the melting furnace in vertical section; Fig. 3 is a side elevation on the opposite side from Fig. 1; Fig. 4 is a vertical section on the line I—J of Fig. 2, and K—K of Fig. 8. This view shows the feed apparatus and the apparatus controlling the movement of the bodies revolving beneath the surface of the molten glass, and which will hereinafter be designated the "lateral feed rolls"; Fig. 5 is a vertical longitudinal section on the line I—J of Fig. 2, and K—K, Fig. 8, and illustrates the position of the cutters or scorers and the relation of the carrier table to the flattening stone; Fig. 6 is a vertical section on the line C—D of Fig. 1, showing the feed apparatus and the manner in which the sheet of glass leaves the lateral feed rolls; Fig. 7 is an elevation, partially in section, on the line E—F of Fig. 1; Fig. 8 is a sectional plan on the line G—H of Fig. 1; Fig. 9 is a continuation of Fig. 8, showing the flattening stones with their relation to the carrier of the separating chamber, and also their relation to the annealing or cooling leer; Figs. 10 and 11 are elevational details showing the apparatus controlling the cutters or scorers; Fig. 12 is a perspective view with the melting furnace or tank in section on the line M—M of Fig. 3; Figs. 13 and 14 show two forms which the lateral feed rolls may have; Fig. 15 is one form of cutter or scorer which may be employed, another form being shown in the other figures of the drawings, and more particularly in Fig. 7; Figs. 16 and 17 illustrate different forms of baits which may be employed in drawing the sheet, still another form being illustrated in the main figures of the drawing.

Referring to the drawings, and particularly to Figs. 1 and 3, 1 is a melting furnace of any suitable or usual construction; 2 is a heating chamber adjacent to, but somewhat above, the working end of the melting furnace 1; 3 is a chamber separated from but adjacent to the heating chamber 2; 4 is a flattening furnace; and 5 is an annealing or cooling leer; said chambers, furnace and leer being arranged adjacent to each other in the order named. For convenience in working the apparatus, the glass melting tank 1 is on a level 6, while said chambers, flattening furnace and leer are on a higher level 7, the two levels being conveniently reached by a series of steps 8.

The mass of plastic glass contained in the melting tank or furnace 1 passes preferably from the main portion of the tank into a working chamber 10, partitioned off from the main body of the tank by partitions 11 retained in place by lugs 12—12 depending from the body or cover of the melting tank or furnace 1, as will be clearly understood by reference to Fig. 4. The main body of the molten glass 9 in the tank 1 communicates in any suitable way with the working chamber 10, preferably by means of suitable openings 13—13 formed in the partition walls constituting the sides of the working chamber 10. As here shown these openings 13 are at the lower part of the melting furnace or tank, though they may be at any desired position in the partitions 11. The melting tank or furnace 1 is entirely covered, and a long narrow slot 125, Fig. 4, is formed in said cover over the working chamber 10, portions of the cover extending in the form of lips 14—14 toward each other from the tops of the partitions 11—11 of the working chamber or pot.

Referring to Figs. 2, 4 and 12, 15—15 are a pair of revolving bodies, here shown in the form of spheres of refractory material, which bodies constitute the lateral feed rolls for imparting the upward and outward movement to the molten glass in the tank 1 adjacent to the edges of the sheet being drawn. These lateral feed rolls 15, 15, are slowly revolved in the direction indicated by the arrows in Fig. 2, and for the purpose of imparting the said revolutions to these rolls the shanks of said rolls are inclined upwardly and outwardly from the mass of molten glass in the working chamber, and have any suitable power applied to them. As here shown, these shanks are engaged by clamps 16, Fig. 4, whereby they are secured to shafts 22 having thereon worm gears 21 and turning in bearings 23. The worm gears 21 are in mesh with right and left worms 20, see Fig. 12, secured on a shaft 19 turning in suitable bearings 50 supported by an angle beam 32 carried on arms or brackets 33 projecting from the wall of the furnace. The shaft 19 is driven by a sprocket chain 17 passing over a sprocket wheel 18 on said shaft, said sprocket chain receiving movement from the main driving shaft of the machine through connections which will be hereinafter described.

In order to determine the exact position of the lateral feed rolls 15 within the molten glass of the working chamber, means are provided for elevating or lowering the driven shafts of said rolls and with them the mechanism for imparting motion thereto. This elevating and depressing means will be best understood from an inspection of Figs. 4 and 12. The bearings 23 for the shafts 22 which drive the lateral feed rolls 15 are each mounted to turn loosely around the shaft 19, as will be clearly seen in Fig. 12, and above said shaft 19 is a hand wheel 24 on a shaft 25 turning in bearings 26 and having a worm 27 thereon engaging with a worm gear 28 secured to a shaft 29. Rigid on the shaft 29, or keyed thereto so that it cannot turn thereon, is an arm 30, to the outer end of which is attached a depending link 31 secured to the bearings 23 of the shaft 22. It will be understood that there is a crank wheel and connected parts for each of the bearings 23 (see Fig. 8). By revolving the respective crank wheels 24, the bearings 23 and with them the lower ends of the shafts 22 may be independently elevated or lowered, as desired, thereby enabling the workman to position the lateral feed rolls 15, as he may desire, in the surface portion of the molten glass in the working chamber.

Referring to Figs. 1 and 3, 34 is the main driving shaft from which the power for moving the apparatus is drawn, said driving shaft receiving motion from any suitable source of power. The driving shaft 34 is connected to shafts 35, 36, 37 and 74 by belts 38, 39, 41 and 40, respectively. The shaft 36 is not a continuously driven shaft, and the belt 39 connecting it with the drive shaft 34 passes from a fast and loose pulley 108 on shaft 34, the shaft 36 being used to impart motion to the bait at the beginning of the drawing operation and after that being thrown out of operation until it is desired to again start the operation. The shaft 37, connected to the main driving shaft 34 by way of a shaft 35 and belts 38 and 41, has mounted thereon within the heating chamber 2 (see Fig. 4) sprocket wheels 42, over which sprocket wheels pass a pair of sprocket chains supporting the carrier table 43, the other or forward end of the said chains passing over sprocket wheels 44 keyed to a shaft 45, also passing transversely through the heating chamber 2.

Referring to Figs. 1 and 8, 46 is a sprocket wheel on the exterior end of the shaft 45, over which sprocket wheel passes a sprocket chain 47 also engaged by a sprocket wheel 49 on the exterior end of the shaft 48 which also passes transversely through the extreme forward end of the heating chamber 2. There is another sprocket wheel 67 on the end of shaft 48 which drives the sprocket chain 17 hereinbefore referred to as imparting movement to the lateral feed rolls 15, 15.

Referring to Fig. 6, 51 is a roll keyed to the shaft 48 in the immediate front end of the heating chamber 2, the front edge of this roll being immediately over a slot or opening 131 (Fig. 4) in the bottom of said heating chamber, which opening 131 is immediately over the opening 125 heretofore mentioned in the top of the working chamber and immediately over the lateral feed rolls 15, 15.

Referring to Figs. 1, 2 and 6, 53—53, 53—53, are four stub shafts projecting outward from the opposite walls of the heating chamber 2, and 54 is a sprocket wheel integral with or fast to a gear wheel 55, both free to turn upon one of the shafts 53, the gear wheel 55 gearing in turn with gear wheel 56 on a shaft 59 (Figs. 1 and 4) extending transversely through the chamber, 2, and parallel with shaft 66 also extending through the chamber at its forward end. Each shaft takes bearing in the lower ends of the arms 57—57, 57—57, depending from the stub shafts 53. This shaft 59 drives the mechanism for feeding the sheet of glass through the heating chamber in the following manner: 61—61 are a pair of sprocket chains passing over sprockets 60—64 on shafts 59 and 66, respectively. Carried by the sprocket chains 61—61 are a plurality of suitably spaced bars or strips 62 which act to grip the sheet of glass against the carrier table and advance it through the chamber. The sprocket wheel 54 is connected by the sprocket chain 63 to a sprocket wheel 65 secured to the exterior end of the shaft 37, the other end of which shaft has a pulley 52 (see Fig. 3) over which the driving belt 41 passes from the shaft 35. The two shafts 66 and 59 have their ends projecting through the side walls of the chamber 2, slots concentric with the shafts 53 being provided for this purpose, as will be understood from an inspection of Fig. 1. The ends of these shafts 59 and 66 are connected by rods 69 (see Figs. 1 and 3) to one of which rods there is connected a hand lever 70, pivoted at 71 in such a manner that, when turned around its axis 71, the hand lever will move the rods 69 and with them the shafts 59 and 66 in an arc around the stub shafts 53, for the purpose of raising or lowering said shafts 59, 66, and with them the grips 62 on the chains 61 driven by said shafts, as shown in dotted lines in Fig. 1.

Referring to Fig. 5, there will be seen within the conveying chamber 3 a continuous carrier 72 supported on sprocket chains passing over sprockets 76 and 77 carried on shafts 74 and 75 extending transversely through the chamber 3, a driving pulley 73 being on one of the exterior ends of the shaft 74 and connected to the main driving shaft 34 by the belt 40.

Referring to Figs. 4 and 5, 78 indicates the sheet of glass and 79 (see Fig. 5) indicates the point where the glass has been scored or otherwise marked for the purpose of severing the sheet 129 (Fig. 5) from the main portion. Any suitable apparatus may be employed for imparting the score, as at 79, to the sheet of glass. As herein shown the apparatus more specifically illustrated in Figs. 3, 5, 7, 10 and 11 is employed.

On the outward or projecting end of the shaft 75 which extends transversely through the forward end of the chamber 3 for the driving and supporting of the carrier thereon, is a gear wheel 80 fast on the shaft and meshing with a similar gear 82 running loosely on a spur shaft 81 projecting from the side of the wall of the furnace or chamber 3, which gear wheel 82 has fast thereto, and also loosely turning on the shaft 81, a cam wheel 83 of uniform diameter except for a cam notch 83′ formed in its periphery, as clearly illustrated in Fig. 10. A second cam wheel 84 having the same diameter as cam wheel 83 is also mounted to turn loosely on the shaft 81, and has fast thereto a gear wheel 85 which meshes with a gear 86 also keyed to the shaft 75. The relative sizes of the gears 85 and 86 are such that the cam 84 is given but one revolution to several revolutions of the shaft 75, whereas the relative proportions of the gears 80 and 81 are such that the cam 83 receives several revolutions for each revolution of the shaft 75. The proportion of the parts is such that the slowly-revolving cam 84 makes one revolution during the time that it takes the sheet of glass to advance the distance included between two of the grips 62, 62, fixed on the feed chains 61 in chamber 2. This second and slowly-revolving cam disk 84 has formed in its periphery a cam notch 84′ (see Fig. 10) similar to the cam notch 83′ in the cam wheel or disk 83. Both of the cam wheels or disks 83 and 84 have their peripheries in contact with the anti-friction roller 87 on the short arm of the lever 89 fulcrumed at 88 (see Fig. 10), the long arm of which lever is provided with a suitable adjustable counterweight 90 tending to depress the long arm of the lever and elevate the short arm carrying the anti-friction roller 87 in contact with the two cam wheels, and the roller is thereby held in intimate contact with the surface of the cam wheels and at the proper time is forced into the cam notches 83′, 84′, on said cam wheels. Adjacent to the long arm of the lever 89 is an ordinary 4-way valve 91, which valve is controlled and operated by a crank arm 91′ connected to the long arm of the lever 89 by a suitable link 92. The casing of the 4-way valve 91 is also provided with a pipe 94′ leading to a suitable source of compressed air and an orifice or port 95′ leading to the atmosphere.

As shown in Figs. 3, 7 and 10, the parts are in position to permit the compressed air to pass via the pipe 94′, 4-way valve, and the pipe 94 to the bottom of the compressed air cylinder 93, and thereby elevate the piston in said cylinder. The top of the cylinder is in communication with the atmosphere by way of the pipe 95 and the port 95′. Should the long arm of the lever 89, however, be depressed, the valve 91 will be shifted so as to place the lower end of the cylinder via pipe 94 and vent port 95′ in communication with the atmosphere, and air under pressure would be conducted to the upper part of the cylinder above its piston via pipes 94′ and 95, thereby depressing the piston. It should be remarked that the two cam disks 83 and 84 are so positioned, and the relative speed of their revolutions is so timed, that the cam notches 83′ and 84′ thereon exactly coincide or come opposite each other at the time when the cam notch 84′ is immediately over the anti-friction roller 87, at which instant the weight 90 will act to suddenly lift the roller 87 into the cam notch, thereby depressing the crank arm 91′ of the valve 91 and thus effecting the introduction of compressed air into the cylinder 93 above the piston, as just described. Instantly, however, the rapid revolution of the cam 83 causes its cam notch to travel beyond the anti-friction roller 87 and it is forced not only out of the notch 83′ but out of the notch 84′ as well, thereby elevating the weight 90 and restoring the 4-way valve 91 to the position shown in Fig. 10 and instantly raising the piston in the cylinder 93.

The piston rod 96 of the cylinder 93 is designed to quickly operate the scorers for effecting the score in the moving and now plastic sheet of glass. This is accomplished by the following mechanism: A 2-armed lever 97 is fulcrumed at 98 and to one arm of the lever is connected a link 99, while to the other arm is connected a link 100, these two links being in turn respectively connected to levers 101—102 fulcrumed at 106 and 105 and connected between their fulcrum points and the links 99 and 100 by links 103 and 104 to scorers 132 and 133, shown in Figs. 5 and 7. By reference to these figures it will be seen that the scorers are located immediately between the chambers 2 and 3 and in a position to act upon the glass as it emerges from chamber 2, and is in the act of passing into chamber 3. The quick stroke of the scoring devices, effected as heretofore described, enables the sheet of plastic glass to be scored without interrupting its forward movement.

Referring to Figs. 2, 4 and 6, 107—107 are suitable bearings, mounted preferably upon the top of the rear end of chamber 2, for a shaft 36 carrying a drum 109 upon which are wound two suitable chains or cables 110—110 having attached thereto a glass-drawing bait 111 of any suitable form or description such, for example, as shown in Figs. 16 and 17, though other forms, if desired, may be employed, one other form being shown in the other drawings. The drum 109 is driven by pulley 112 on the projecting end of its shaft (see Fig. 6) which pulley has a belt 39 passing over it and extending to the fast and loose pulley 108 on the shaft 34. When the pulley 108 is adjusted on the shaft 34 so as to connect it thereto, the drum 109 is revolved and when the pulley 108 is thrown out of clutch with the shaft 34, the drum 109 is stationary.

Formed in one side of the wall of chamber 3 is a slot 113 extending also along through the walls of the flattening oven 4 (see Figs. 5 and 9). This slot 113 is for the purpose of inserting the glass-lifting fork 114. This fork 114 is supported by a chain or cable 115 attached to trolley 116 traveling on overhead ways 117 so positioned as to enable the fork to be moved from its position in chamber 3 along the slot 113 into the flattening furnace 4, as will be readily understood by inspecting Fig. 1. Within this flattening chamber 4 is the usual or any suitable flattening wheel 118 provided with any suitable number, usually four flattening stones 119, and having the usual or any suitable fire-box 120 (see Fig. 9). The flattening furnace 4 is also provided with a suitable opening 121 as shown in Fig. 9, through which a second lifting fork, as 122 (see Fig. 8) may be inserted for handling the glass. The annealing or cooling oven or leer 5 has the usual or any suitable rocker and carrying rods 123 projecting into the side of the flattening furnace 4, as usual in such constructions, for the purpose of receiving the flattened sheet and advancing it through the leer in the usual way.

Referring to Fig. 4, 124 is a cover for placing over the working slot 125, formed between the overhanging lips 14—14 above the working chamber 10, when the apparatus is not in use, and 126—126 are suitable burners for imparting the desired amount of heat to the drawn sheet before it is turned from its vertical to its horizontal position across the roller 51. As before mentioned it is important, before this turning of the sheet is effected, that it should be heated to such a degree as to enable it to be readily bent over the roller 51 and yet to be hard enough so as not to mar the fine fire finish of the sheet by contact with said roller. This adjustment of the temperature is effected by the burners 126—126. Additional burners, as 127, are also supplied for regulating the temperature of the furnace 2, and at the exit of the furnace or heating chamber 2 are provided additional burners 128—128 on opposite sides of the sheet, as shown, to the end that the glass as it emerges from the heating furnace shall have the required degree of plasticity to enable the scoring devices, which act immediately after it leaves the heating chamber 2, to effect the scoring operation without danger of shattering or breaking the sheet. 129 (Fig. 5) represents a section of the sheet separated therefrom and being elevated on the fork 114 to be advanced from the chamber 3 to the flattening oven 4. The chamber 2 is also provided at its forward end with a suitable door 130, and at the bottom of its forward end with a working slot or opening 131 adjacent to which are the burners 126—126 heretofore mentioned. At the opposite end of the chamber 2 from the door 130, i. e., at the exit end thereof, there is located a shaft 134 just above the line of travel of the sheet of glass 78, and on this shaft is an idler roller 135 whose use will presently be described. There is also provided in the flattening furnace 4 an opening 136 through which the workman inserts suitable tools, such as the bass-wood block, for the purpose of perfecting the flattening operation. As the sheet passes from chamber 2 to chamber 3 it is supported by roller 137. The temperature of chamber 3 is controlled by suitable burners as 138 (Fig. 5).

Operation: The mass of glass 9 in the melting or refining furnace 1 having been brought to the proper working condition, the cover 124 having been removed from over the working slot or opening 125 and the lever 70 having been moved from the full line to the dotted line position, shown in Fig. 1, so as to elevate the feed device out of operative relation with the carrier table 43 in chamber 2, and a suitable bait of a length substantially equal to that of the distance between the lateral feed rolls 15—15 having been attached to the chains 110, a workman inserts a long rod with a hook on the end of it through the opening 130 in chamber 2, out through the rear end of the chamber, and under the idler roll 135, where another workman attaches the bait to the hooked rod and it is drawn under the idler roll 135 and forward in the chamber 2, over the roller 51 and allowed to fall down through the slot 131 in the bottom of said chamber and the working slot or opening 125 between the overhanging lips 14—14 of the working chamber 10 and into the mass of the molten glass, where the lateral feed rolls 15—15 have been adjusted by the adjusting mechanism operated by hand wheels 24 so as to have them immersed to the desired extent within the mass of molten glass in the working chamber. The driving mechanism for said rolls having been started so as to very slowly revolve them in the directions indicated by the arrows in Fig. 6, the pulley 108 is thrown into clutch with the drive shaft 34 and the chains 110—110 are slowly wound upon the drum 109, thereby elevating the bait and drawing the sheet of glass upward through the working slots or openings 125 and 131, and between the burners 126—126 which have been lighted and the heat of the furnace thereby adjusted so as to produce the desired temperature of the sheet to enable it to be bent over the roller 51 in the chamber 2. As the bait advances it draws the sheet over the roller 51, and the carrier 43 having been set in motion, the sheet is pulled along by the bait until the bait itself extends out from under the idler roller 135. It will be understood that the roller 51, the carrier 43 and the bait 111 are all driven at the same uniform speed during this operation. As the bait emerges from under the idler roller 135, it is detached from the sheet by cracking off, or in any other suitable way, and the chains 110 being wound or nearly wound upon the drum 109, the pulley 108 is thrown out of clutch with the drive shaft 34 and the bait and its driven drum 109 are no longer used until it is desired to again initiate the operation, i. e., to begin the pulling of another continuous sheet; and this indeed may not occur for many days, since if the supply of glass in the melting furnace is maintained, the operation of the mechanism herein described may continue indefinitely. Just before the drum 109 is stopped and the bait detached from the sheet of glass, the lever 70 is lowered from the dotted line position of Fig. 1, into that of the full line position of said figure, thereby bringing the feed grips 62—62 upon the feed chains 61 into operative engagement with the sheet of glass, and thenceforth in the operation the feeding or advancing of the sheet of glass is effected by these grips. These grip bars 62, 62, of course mar the surface of the sheet at points where they engage the same, but as the parts are so adjusted that the scorers for scoring the sheets act upon the lines where the grips have engaged the sheets, no substantial waste results therefrom.

The burners with the chamber 2 and at the exit thereof having been lighted, to place the glass in proper plastic condition for scoring, the scorers operate immediately after the glass passes from the heating chamber 2 and just before it enters the chamber 3, which latter chamber is one having its temperature somewhat lower than that of chamber 2, its office being to prevent the sheet of glass from being chilled too suddenly, which would cause the same to shatter or break. Nevertheless, in chamber 3 the temperature of the glass is slightly lowered, and after the scored section of the sheet is advanced well into the chamber, the workman inserts the lifting fork 114 through slot 113, as shown in Figs. 1, 5 and 8, and passing it under the scored section, slightly lifts or elevates the free end of the section, and thereby cracks said section from the main advancing sheet, whereupon the workman moves the fork by means of the trolley 116 forward, and places the section of glass upon the flattening stone 119 in position $w$, Fig. 9. From position $w$ the sheet of glass is advanced by the intermittent motion of the flattening wheel to position $x$, where the sheet is brought under the influence of heat from the heating chamber 120, whereupon a workman inserts a suitable flattening tool through the opening 136 and completes the flattening operation, after which the stone 119 moves to position $y$ whose temperature is so much lowered that the sheet is cooled therein to condition to permit it to be handled, when the sheet advances to position $z$ at which point the workman inserts a lifting fork through the opening 121 and, lifting the sheet, places it upon the rocking bars 123 of the annealing and cooling leer by which it is advanced through the leer, at the further end of which it is received by the workmen, and after being washed is cut into suitable sizes for the market. The glass as it reaches the chamber 3 and is separated into sections 129, as shown in Fig. 8, is in a fairly flattened condition, and instead of being treated in the flattening oven it may be passed directly to the cooling or annealing leer, though more satisfactory results are attained and a more perfect article is secured by passing it through the flattening oven, as described.

In drawing sheet glass one of the great difficulties to overcome is the tendency of waves, frequently of minute character, to develop in the surface of the drawn sheet. We have discovered that one great cause of these objectionable waves in the sheet is the fact that the surface of the glass in the working pot has the wave-like condition imparted to it by unevenness of the walls of said pot itself. Even when these walls have been made as smooth as possible and present no roughness visible to the naked eye, the unevenness is nevertheless present. Moreover, dirt and other foreign matter is liable to become attached to the side walls and thus produce a rough surface which will impart the wave-like appearance to the surface of the drawn sheet unless means are provided to prevent it. By covering over the working chamber 10, as with the lips 14, 14, the surface of the glass is protected from the cooling effect of the exterior air and the heat of the glass in the furnace 1 serves to heat up the partitions 11, 11, and these and the glass in the pot 10 serve to heat the under side of lips 14, 14. With partitions 11, 11, thus heated to a high temperature, the surface of the glass in the pot in immediate contact with the partitions will be maintained in too fluid a condition to be affected by or receive form from the roughness on the partitions. The reflected heat from the lips 14, 14 also assists in keeping the surface of the glass in the pot 10 in condition to avoid receiving impressions from the roughness on the partition walls.

The glass might be drawn directly from the end of the melting or refining furnace, or different forms of working chambers or pots might be used in connection therewith from that shown in the drawings. The advantage of having the partitions, however, between the main body 9 of the glass in the melting furnace 1, and that in the working chamber or pot 10, lies in the fact that the mass of glass in the working chamber or pot may have its temperature more accurately adjusted so as to bring it into precisely the condition desired for working.

The detailed construction and operation of the flattening furnace and the annealing and cooling leer has not been herein described, for the reason that such construction is not of our invention, any suitable flattening furnace or device and any suitable cooling or annealing chamber or leer being sufficient.

What is claimed is:

1. The method of making sheet glass, which consists in preparing a mass of molten glass, drawing a continuous sheet of glass therefrom, and during the drawing operation imparting movement to the surface portion of the molten mass away from the medial line toward both edges of the sheet, then heating the sheet to insure its plastic condition scoring the plastic sheet to obtain a line of cleavage, then lowering the temperature of the glass and separating a section of the sheet along the scored line.

2. The method of making sheet glass, which consists in drawing a continuous sheet of glass of uniform width, scoring the sheet while plastic to obtain a line of cleavage, then lowering the temperature of the glass and separating a section of the sheet along the scored line.

3. The method of making sheet glass, which consists in drawing upwardly a sheet of glass of uniform width, regulating the temperature of the sheet so it can be bent to a horizontal position without breakage, then raising the temperature of the sheet to soften it, then scoring the softened sheet to obtain a line of cleavage, then lowering the temperature of the glass and separating a section of the sheet along the scored line.

4. The method of making sheet glass, which consists in preparing a mass of molten glass, drawing a continuous sheet of uniform width therefrom, scoring the drawn sheet when in a plastic condition to obtain lines of cleavage, lowering the temperature of the glass and separating sections of the sheet along the scored lines.

5. The method of making sheet glass, which consists in preparing a mass of molten glass, drawing a continuous sheet of uniform width therefrom, scoring the drawn sheet when in a plastic condition to obtain lines of cleavage, lowering the temperature of the glass and separating sections of the sheet along the scored lines, and annealing the severed sections.

6. The method of making sheet glass, which consists in preparing a mass of molten glass, drawing a continuous sheet of uniform width therefrom, scoring the drawn sheet when in a plastic condition to obtain lines of cleavage, lowering the temperature of the glass and separating sections of the sheet along the scored lines, flattening the severed sections, and then annealing the sand.

7. The method of making sheet glass, which consists in preparing a mass of molten glass, drawing a sheet of glass from said mass, imparting an outward movement to said molten mass at the points where the edges of the sheet emerge from said molten mass, whereby a sheet of uniform width is continuously produced, scoring said sheet when plastic and then separating a section of the sheet along the scored line.

8. The method of making sheet glass, which consists in preparing a mass of molten glass, drawing a sheet of glass from said mass, simultaneously imparting movement to the surface of said mass adjacent the edges of the sheet as drawn and in opposite directions and away from the medial line of the sheet, and severing sections from said sheet while the drawing operation continues.

9. The method of making sheet glass, which consists in preparing a mass of molten glass, drawing a sheet of glass from said mass, simultaneously imparting movement to the surface of said mass adjacent the edges of the sheet as drawn and in opposite directions and away from the medial line of the sheet, severing sections from said sheet while the drawing operation continues, and then annealing said sections.

10. The method of making sheet glass, which consists in preparing a mass of molten glass, drawing a sheet of glass from said mass, simultaneously imparting movement to the surface of said mass adjacent the edges of the sheet as drawn and in opposite directions and away from the medial line of the sheet, severing sections from said sheet while the drawing operation continues, then flattening and then annealing said sections.

11. The method of making sheet glass by a continuous operation, which consists in drawing the glass into a continuous sheet of uniform width, reheating the glass after the cooling incident to the drawing operation, and then separating the continuous sheet into sections.

12. The method of making annealed sheet-glass by a continuous operation, which consists in drawing the glass into a continuous sheet of uniform width, reheating the glass after the cooling incident to the drawing operation, separating the continuous sheet into sections, then flattening and annealing the glass.

13. The method of making sheet glass by a continuous operation, which consists in drawing the glass upwardly into a continuous sheet of uniform width, reheating and thereby softening the glass after the cooling incident to the drawing operation, then bending the sheet of glass from its upwardly extending to a horizontal line of travel, and then annealing the glass.

14. The method of making sheet-glass by a continuous operation, which consists in drawing the glass upwardly into a continuous sheet of uniform width, reheating and thereby softening the glass after the cooling incident to the drawing operation, then bending the sheet of glass from its upwardly extending to a horizontal line of travel, and then flattening and annealing the glass.

15. The method of making sheet glass by a continuous operation, which consists in drawing the glass upwardly in a continuous sheet of uniform width, reheating and thereby softening the glass after the cooling incident to the drawing operation, then bending the sheet of glass from its upwardly extending to a horizontal line of travel, then separating the sheet into sections and then flattening and annealing the glass.

16. The method of making sheet-glass by a continuous operation, which consists in preparing a mass of molten glass, drawing the glass in a continuous sheet therefrom while simultaneously imparting movement to the surface portion of the molten mass away from the medial line of the sheet towards its edges, separating the sheet into sections while the drawing operation continues, and then annealing the separated sections.

17. The method of making sheet-glass by a continuous operation, which consists in preparing a mass of molten glass, drawing the glass in a continuous sheet therefrom while simultaneously imparting movement to the surface portion of the molten mass away from the medial line of the sheet towards its edges, separating the sheet into sections while the drawing operation continues, and then flattening and annealing the separated sections.

18. The method of making sheet-glass by a continuous operation, which consists in preparing a mass of molten glass, drawing the glass therefrom in a continuous sheet while the surface portion of said mass is kept moving away from the medial line of said sheet towards its edges, reheating and thereby softening the glass after the cooling incident to the drawing operation, and then separating the sheet into sections.

19. The method of making sheet-glass by a continuous operation, which consists in preparing a mass of molten glass, drawing the glass therefrom in a continuous sheet while the surface portion of said mass is kept moving away from the medial line of said sheet towards its edges, reheating and thereby softening the glass after the cooling incident to the drawing operation, then separating the sheet into sections, and then annealing said sections.

20. The method of making sheet-glass by a continuous operation, which consists in preparing a mass of molten glass, drawing the glass therefrom in a continuous sheet while the surface portion of said mass is kept moving away from the medial line of said sheet towards its edges, reheating and thereby softening the glass after the cooling incident to the drawing operation, then separating the sheet into sections, and then flattening and annealing said sections.

21. In an apparatus for continuously drawing sheet glass, a receptacle containing molten glass, means for drawing a sheet of glass of uniform width therefrom, a heating chamber through which said sheet is drawn, a roller in said chamber over which the sheet is passed and bent at an angle to the plane in which it emerged from the molten mass, a carrier in said chamber on which the sheet rests, a feed device coöperating with said carrier to advance the sheet, a second chamber adjacent to but of lower temperature than the first, and means scoring said sheet before it passes into said second chamber, whereby a line of cleavage is obtained.

22. In a continuous sheet-glass drawing apparatus, a receptacle containing molten glass, means for drawing a sheet of glass of uniform width therefrom in an upward direction, a heating chamber into which said sheet passes as drawn, means in said chamber for turning said sheet into a horizontal position, feed mechanism also in said chamber for advancing the sheet, a second or lower temperature chamber adjacent to the heating chamber, and means for scoring the sheet while in a softened or plastic condition due to the heat of the heating chamber.

23. In a continuous sheet-glass drawing apparatus, means for drawing a sheet of glass of uniform width, a continuous sheet-advancing or feed mechanism, means transversely scoring the advancing sheet means securing the softened or plastic condition of the sheet before it reaches said scoring means, and means for separating the scored sections from the drawn sheet.

24. In a continuous sheet-glass drawing apparatus, an initiatory and a continuous means for drawing a sheet of glass of uniform width, means for scoring the sheet at stated intervals, means for softening or rendering the sheet plastic before it reaches said scoring means, and means for separating the scored sections from the drawn sheet.

25. In a continuous sheet-glass drawing apparatus, a bait and means for operating the same to draw a sheet of glass, sheet-advancing mechanism engaging the sheet on lines transverse to its length to feed the sheet and continue the drawing operation after the bait is removed, and means maintaining the uniform width of the sheet during the drawing operation.

26. In a continuous sheet-glass drawing apparatus, a bait and means for operating the same to draw a sheet of glass, sheet-advancing mechanism to feed the sheet and continue the drawing operation after the bait is removed, revolving means maintaining the uniform width of the sheet during the drawing operation, and means separating the drawn sheet into sections.

27. In a continuous sheet-glass drawing apparatus, a receptacle containing molten glass, an initiatory sheet drawing device, means imparting lateral movement to the surface portion of the glass in said receptacle away from the medial line of and towards the edges of the sheet being drawn, and sheet-advancing means acting to feed the drawn sheet forward after the initiatory drawing device has been separated from said sheet.

28. In a continuous sheet-glass drawing apparatus, an initiatory and a continuous means for drawing a sheet of glass, means for maintaining said sheet of uniform width as drawn, means for separating the continuous sheet into sections, and means for flattening and annealing said sections.

29. In a continuous sheet-glass drawing apparatus, a receptacle containing molten glass, a pair of revoluble bodies immersed therein, means for revolving said bodies in opposite directions, means for drawing from said receptacle a sheet of glass with its edges over said bodies, means for separating the drawn sheet into sections, and means for flattening said separated sections.

30. In a continuous sheet-glass drawing apparatus, a receptacle containing molten glass, a pair of revoluble bodies immersed therein, means for revolving said bodies in opposite directions, means for continuously drawing from said receptacle a sheet of glass with its edges emerging from said molten glass in proximity to said revolving bodies, and means for separating the drawn sheet into sections during the drawing operation.

31. In a continuous sheet-glass drawing apparatus, a receptacle containing molten glass, a pair of revoluble bodies immersed therein, means for revolving said bodies, means for continuously drawing a sheet of glass from said receptacle with its edges in proximity to said revoluble bodies, a scoring device for said sheet, means presenting the sheet in plastic condition to said device, and means separating the scored section from the drawn sheet.

32. In a continuous sheet-glass drawing apparatus, a receptacle for molten glass, a pair of revoluble bodies immersed therein, means for revolving said bodies in opposite directions, means for continuously drawing in an upward direction from said receptacle a sheet of glass with its edges emerging from the molten glass at points adjacent to said revoluble bodies, a heating chamber into which the sheet is drawn, a roller over which it is bent in said chamber, and means separating said sheet into sections.

33. In a continuous sheet-glass drawing apparatus, a receptacle for molten glass, means for drawing a sheet of glass therefrom, means moving the surface portion of the molten glass away from the sheet toward its edges, and devices for raising and lowering said last-named means within the molten glass.

34. In glass drawing apparatus, a receptacle containing a mass of molten glass, means for drawing a sheet of glass therefrom, a plurality of revolving bodies immersed in the surface of said mass, and means for independently raising and lowering said bodies in the molten glass.

35. In glass drawing apparatus, a receptacle containing a mass of molten glass, means for drawing a sheet of glass therefrom, a plurality of revolving bodies immersed in said mass and having separate driving shafts connected thereto, and means for separately raising and lowering the bearings for said shafts whereby the positions of said bodies in the molten glass may be separately determined.

36. In glass drawing apparatus, a receptacle containing a mass of molten glass, means for drawing a sheet of glass therefrom, a plurality of revolving bodies immersed in said mass and having separate driving shafts connected thereto, a worm for driving both of said shafts, bearings for said driving shafts adjustable around the axis of said worm, and means for effecting said adjustment.

37. In an apparatus for making sheet-glass by a continuous operation, a receptacle containing molten glass, a chamber through which the continuous sheet of glass is passed as drawn, means continuously advancing the sheet therethrough, a bait, and means for moving said bait from said receptacle through said chamber at the commencement of the operation.

38. In an apparatus for making sheet-glass by a continuous operation, a receptacle containing molten glass, means drawing a continuous sheet of uniform width therefrom, a chamber through which the continuous sheet of glass is passed as drawn, feed means for continuously advancing the sheet therethrough, and means adjusting said feed means into and out of operative position.

39. In an apparatus for making sheet-glass by a continuous operation, a receptacle containing molten glass, a chamber through which the continuous sheet of glass is passed as drawn, an endless carrier moving in said chamber, and continuously moving grip chamber, and continuously moving grip bars engaging the sheet at intervals and advancing it through said chamber.

40. In an apparatus for making sheet glass by a continuous operation, a receptacle containing molten glass, a chamber through which the continuous sheet of glass is passed as drawn, an endless and continuously moving carrier in said chamber and on which the glass rests, and an endless and continuously moving feed device having grip bars at intervals thereon which act to grip the sheet against said carrier to advance said sheet through said chamber.

41. In an apparatus for making sheet glass by a continuous operation, a receptacle containing molten glass, a chamber through which the continuous sheet of glass is passed as drawn, an endless and continuously moving carrier in said chamber and on which the glass rests, an endless and continuously moving feed device having grip bars at intervals thereon which act to grip the sheet against said carrier to advance said sheet through said chamber, and means for throwing said feed device into and out of operative relation with said carrier.

42. In an apparatus for making sheet glass by a continuous operation, a receptacle containing molten glass, a heating chamber, a horizontal carrier therein, means for drawing a continuous sheet of glass of uniform width from said receptacle in an upward direction into said chamber, and a roller in said chamber over which said sheet is bent from its upward to its horizontal line of travel without contact with any other surface.

43. In an apparatus for making sheet glass by a continuous operation, a receptacle for molten glass, means for drawing a continuous sheet of glass of uniform width therefrom, said means including a carrier and a series of transversely extending grip bars engaging said sheet at intervals against said carrier and uninterruptedly continuing the pull or draw on the sheet.

44. In an apparatus for making sheet glass by a continuous operation, means for continuously drawing a sheet of glass of uniform width, feed devices gripping the sheet at regular intervals in its length, and means cutting or scoring the sheet along the lines where it has been engaged by said feed devices.

45. In an apparatus for making sheet glass by a continuous operation, means for continuously drawing a sheet of glass of uniform width, a heating chamber into which it is drawn, feed devices advancing it through said chamber, and cutting or scoring devices acting on said sheet as it emerges from said chamber.

46. The method of drawing a sheet of glass, which consists in providing a mass of molten glass in a suitable receptacle, drawing a sheet of glass therefrom, maintaining said sheet of substantially even width during the drawing operation, and heating the surface of the molten mass above the plastic point along the walls of the receptacle opposite the two faces of the sheet as drawn.

47. The method of drawing a sheet of glass, which consists in providing a mass of molten glass in a suitable receptacle, drawing a sheet of glass of uniform width therefrom, and maintaining the heat of the surface of the molten mass along the lines where it contacts with the walls of the receptacle opposite the faces of the sheet above the impression receiving and retaining point, whereby it is prevented from receiving and retaining any impression from the surface of said walls.

48. In apparatus for drawing sheet glass, the combination of a receptacle containing molten glass, means for drawing a sheet of glass of uniform width therefrom, and means heating the surface of said molten glass above the plastic point along the lines where it contacts with the walls of the receptacle opposite the faces of the sheet as it is drawn.

49. In apparatus for drawing sheet glass, the combination of a receptacle containing molten glass, means for drawing a sheet of glass of uniform width therefrom, means for heating the walls of the receptacle opposite the face of the sheet as drawn, a cover over the receptacle reflecting the heat from said molten glass back upon the surface thereof, and a slot in said cover through which the sheet is drawn, whereby the surface of the glass in said receptacle may be heated above the point where it will receive and retain impressions from the walls of said receptacle.

50. In apparatus for drawing a continuous sheet of glass, means for continuously drawing a sheet of glass of uniform width, means for severing the sheet into sections, means for flattening and annealing said sections, and means protecting said sections from injurious chilling as they pass from the drawing to the flattening means.

51. In an apparatus for the manufacture of sheets of glass, the combination of a basin or receptacle provided with a discharge slot or opening, a heated chamber, a drawing mechanism located in the heated chamber to pull the glass in the plane of the discharge slot or opening, and means for regulating the temperature of the glass in its movement from the slot to the heated chamber.

52. In an apparatus for the manufacture of sheets of glass, the combination of a basin or receptacle provided with a discharge slot or opening, a heated chamber separated from the discharge slot or opening to permit the cooling of the glass, a drawing mechanism located in the heated chamber to pull the glass in the plane of the discharge slot or opening and means for regulating the temperature of the glass in its movement from the slot to the heated chamber.

53. In an apparatus for the manufacture of sheets of glass, a heated chamber, means for gripping and moving a sheet of glass arranged in said chamber and means for operating the gripping mechanism arranged outside of said chamber.

54. In an apparatus for the manufacture of sheets of glass, a heated chamber, gripping mechanism having the portions engaging the glass movable along in said chamber, and means for shifting the gripping mechanism arranged outside of said chamber.

55. In an apparatus for making sheet glass by a continuous operation, a receptacle containing molten glass, a chamber through which the glass as drawn is passed continuously, grip bars engaging the sheet at intervals and an endless carrier for moving the grip bars continuously through the chamber.

56. In an apparatus for making sheet glass by a continuous operation, a receptacle for molten glass, means for continuously drawing a sheet of glass of uniform width from said receptacle, said means including endless belts or chains, a series of transverse bars, movable by said chains and means for clamping the sheet against said bars whereby the pull or draw on the sheet is continuous or uninterrupted.

57. In an apparatus of the class described, the combination with a receptacle for molten glass, of means for drawing glass therefrom, means for heating the drawn glass on a predetermined line, and means for severing it on this line.

58. The process of forming glass articles which consists in drawing glass from a molten mass, heating the article being drawn on a predetermined line, and cutting the article on this line.

59. The combination with means for drawing a glass sheet, of means for severing the sheet, and means for heating the sheet where it is to be severed.

60. The combination with means for drawing a glass sheet, means for severing the same, and means operating to heat the sheet on a line where it is to be severed, during the progress of such severing line to the severing means.

61. In glass working apparatus, the combination of means for drawing a sheet of glass, with automatic means for softening the sheet along a desired line of cut, and automatic cutting devices cutting along the softened line.

62. In glass working apparatus, the combination of means for drawing a sheet of glass, heating means for softening the sheet along a desired line of cut, and a cutter acting along said line.

In testimony whereof we have signed this specification in the presence of two subscribing witnesses.

I. W. COLBURN.
E. WASHBURN.

Witnesses:
THOMAS MCGOUGH,
ROBERT N. SPEER.